(12) United States Patent
Tabata et al.

(10) Patent No.: US 9,263,086 B2
(45) Date of Patent: Feb. 16, 2016

(54) MAGNETIZATION CONTROL FOR MAGNETIC SHIELD IN MAGNETIC RECORDING HEAD

(71) Applicant: HGST Netherlands B.V., Amsterdam (NL)

(72) Inventors: Satoshi Tabata, Chigasaki (JP);
Norifumi Miyamoto, Chigasaki (JP);
Akira Morinaga, Chigasaki (JP);
Masahiro Ito, Odawara (JP); Masahiko Hatatani, Kamakura (JP)

(73) Assignee: HGST Netherlands B.V., Amsterdam (NL)

( * ) Notice: Subject to any disclaimer, the term of this patent is extended or adjusted under 35 U.S.C. 154(b) by 89 days.

(21) Appl. No.: 14/227,933

(22) Filed: Mar. 27, 2014

(65) Prior Publication Data

US 2015/0279416 A1    Oct. 1, 2015

(51) Int. Cl.
G11B 11/00    (2006.01)
G11B 20/10    (2006.01)
G11B 5/11     (2006.01)
G11B 5/00     (2006.01)

(52) U.S. Cl.
CPC ............ *G11B 20/10212* (2013.01); *G11B 5/11* (2013.01); *G11B 2005/0021* (2013.01)

(58) Field of Classification Search
None
See application file for complete search history.

(56) References Cited

U.S. PATENT DOCUMENTS

| 4,935,830 | A  |   | 6/1990  | Hiraoka et al. |
|-----------|----|----|---------|----------------|
| 5,455,723 | A  | * | 10/1995 | Boutaghou ............... G11B 5/54 360/75 |
| 5,657,190 | A  | * | 8/1997  | Araki ..................... B82Y 10/00 360/324 |
| 5,844,746 | A  |   | 12/1998 | Uwabo et al. |
| 7,042,674 | B1 | * | 5/2006  | Baril ..................... G11B 5/6005 360/75 |
| 7,397,633 | B2 | * | 7/2008  | Xue ....................... B82Y 25/00 360/125.03 |
| 7,468,861 | B2 |   | 12/2008 | Eguchi et al. |
| 7,474,510 | B1 | * | 1/2009  | Baril ..................... G11B 5/3903 360/256.2 |
| 7,576,944 | B2 |   | 8/2009  | Eguchi et al. |
| 7,595,952 | B2 |   | 9/2009  | Ohtsu |
| 8,804,280 | B2 | * | 8/2014  | Lopusnik ............... G11B 5/312 360/110 |
| 2006/0023366 | A1 | * | 2/2006 | Antoku ................... G11B 5/39 360/256.2 |
| 2008/0158723 | A1 | * | 7/2008 | Ohta ...................... G11B 5/54 360/86 |
| 2011/0149427 | A1 | * | 6/2011 | Cheng .................... G11B 5/012 360/69 |
| 2012/0026628 | A1 | * | 2/2012 | Li ......................... G11B 5/1278 360/246.1 |

FOREIGN PATENT DOCUMENTS

JP    09102109 A  *  4/1997
JP    2002150510 A *  5/2002
JP    2011-210331     10/2011

* cited by examiner

*Primary Examiner* — Wayne Young
*Assistant Examiner* — Mark Fischer
(74) *Attorney, Agent, or Firm* — John D. Henkhaus

(57) ABSTRACT

A hard disk drive (HDD) is described which includes a magnetic field-generating device in the vicinity of a load/unload ramp such that the write head moves into a magnetic field generated by the device while the head is being unloaded from disk, whereby the magnetic field pins in a predominant direction the direction of magnetization of a magnetic shield associated with the write head, and away from the direction toward the disk. Recording magnetic field leakage associated with the shield is thereby suppressed and corresponding far track interference is inhibited.

19 Claims, 7 Drawing Sheets

US 9,263,086 B2

MAGNETIZATION CONTROL FOR MAGNETIC SHIELD IN MAGNETIC RECORDING HEAD

FIELD OF EMBODIMENTS

Embodiments of the invention may relate generally to a magnetic recording head and more particularly to managing the magnetic field of a magnetic shield in a magnetic recording head.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present goals of hard disk drive design evolution. In turn, as recording tracks in HDDs become narrower and narrower and bits are recorded smaller and smaller, there is a need to raise the recording magnetic field strength to improve the recording capabilities correspondingly. However, as the recording magnetic field strength is raised the probability of the magnetic field leaking outside of a desired recording track likewise increases. This is an undesirable situation because a strong magnetic field leakage can cause ATI ("Adjacent Track Interference") to tracks immediately adjacent to the desired track, or FTI ("Far Track Interference") to tracks more than a track away from the desired track. Either scenario, ATI or FTI, is likely to cause data disappearance of or corruption to the adjacent or far track, thus causing read errors. Thus, the manner in which ATI and/or FTI is managed and inhibited is an important factor in improving the performance of HDDs.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a hard disk drive (HDD) having a magnetic field-generating device in the vicinity of a load/unload ramp such that the write head moves into a magnetic field generated by the device while the head is being unloaded from disk, whereby the magnetic field pins in a predominant direction the direction of magnetization of a magnetic shield associated with the write head. For example, and according to embodiments, the magnetic shield is positioned on the trailing side of the main (write) pole, and the predominant direction of magnetization of the magnetic shield is in the cross-track direction. Therefore, recording magnetic field leakage associated with the shield is decreased or eliminated and corresponding far track interference is inhibited.

According to embodiments, the magnetic field-generating device may comprise a permanent magnet, an electromagnet, or an AC-based magnetic field-generating device. Further, and according to an embodiment, the magnetic field-generating device is constituent to the load/unload ramp.

Embodiments discussed in the Summary of Embodiments section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a controlling the magnetization of a magnetic shield in a magnetic recording head are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments

Figure 1:
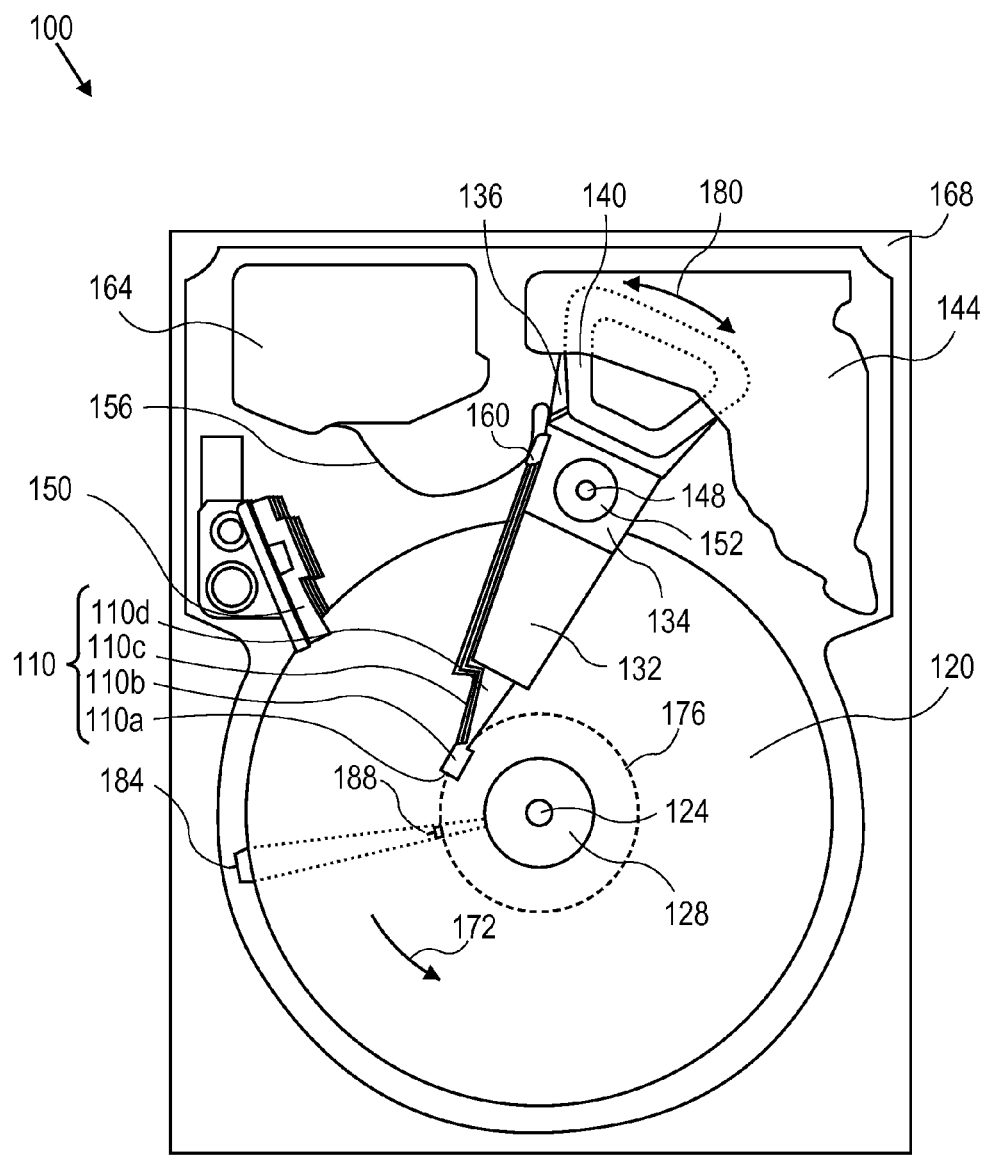
FIG. 1 is a plan view illustrating a hard disk drive (HDD), according to an embodiment of the invention.

Embodiments of the invention may be used in the context of a magnetic recording head, or magnetic writer, for a hard-disk drive (HDD). Thus, in accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

Continuing with reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions (or "track sector"), for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

While an HDD such as HDD 100 is idle for a period of time (i.e., it is not performing read or write operations), or in a power off situation, it may be desirable to unload the head 110a away from the surface of the disk 120. Thus, some HDDs are equipped with a load/unload ramp, such as load/unload ramp 150 of HDD 100, on which the head slider may be parked. Ramp load/unload technology involves a mechanism that moves the sliders off the disks and safely positions them onto a cam-like structure, which is equipped with a shallow ramp on the side closest to the disk. For loading, the sliders are moved off the ramp and over the disk surfaces when the disks reach the appropriate rotational speed.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

A perpendicular magnetic recording (PMR) system records data as magnetizations oriented perpendicular to the plane of the magnetic recording disk. The magnetic disk has a magnetically soft underlayer covered by a thin magnetically hard top layer. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Magnetic Recording Head

Figure 2:
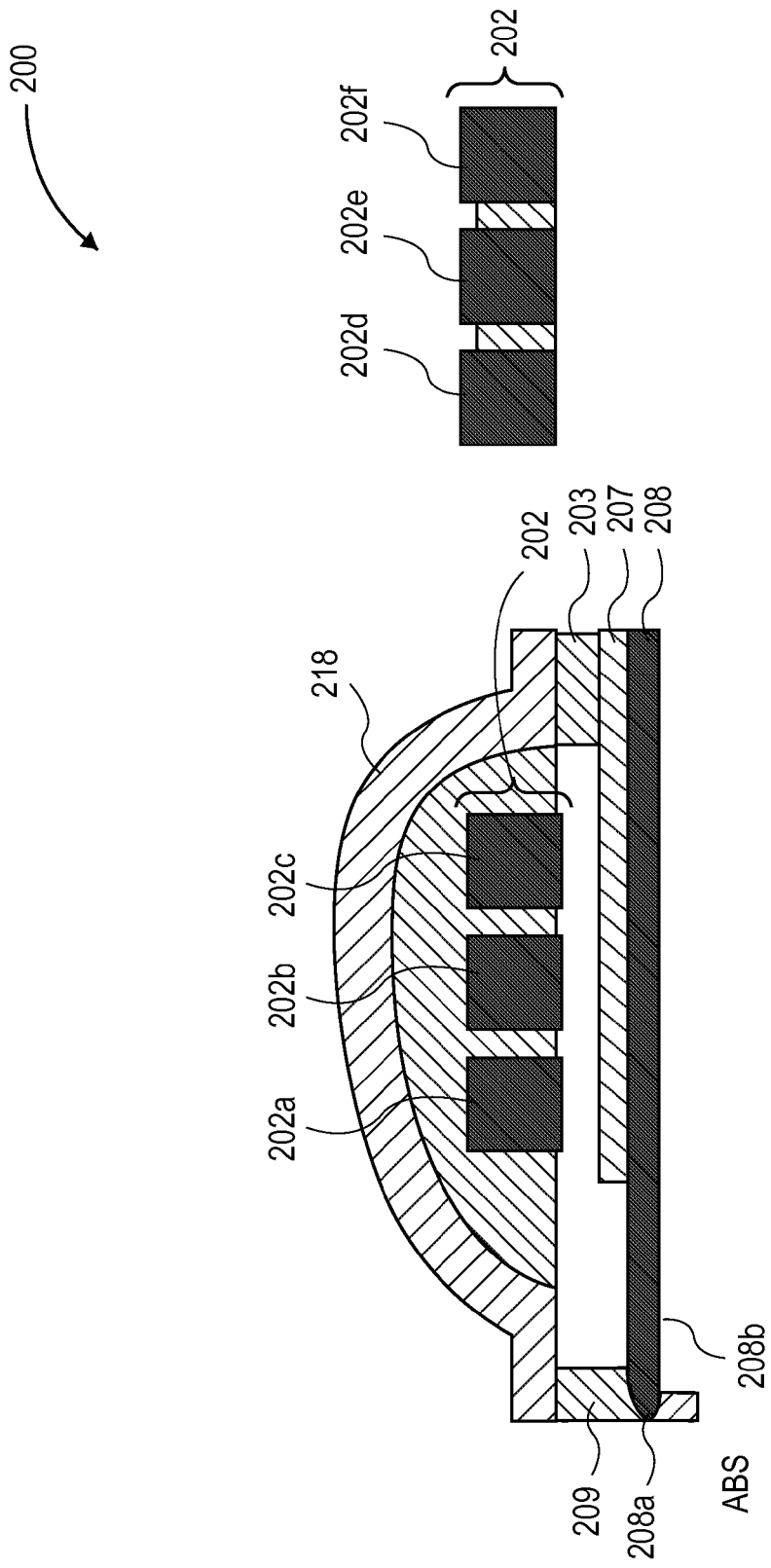
FIG. 2 is a cross-sectional side view illustrating an example magnetic recording ("write") head.

FIG. 2 is a cross-sectional side view illustrating an example magnetic recording ("write") head. Write heads make use of the electricity flowing through a coil 202 in the write head 200, which produces a magnetic field. One type of coil design is positioned in a generally planar configuration near the write pole, e.g., main pole 208. Such a write head includes an electrical coil 202 having inner coil portions 202a, 202b, 202c positioned above and generally adjacent to the main pole 208 and outer coil portions 202d, 202e, 202f positioned away from the main pole 208 and the ABS (air bearing surface), which faces the magnetic recording disk (see, e.g., media 120). Another type of coil design is referred to as a helical coil (not depicted) because it wraps around the main pole 208, in a helical shape, and includes upper coil portions that pass above the main pole 208 and lower coil portions that pass below the main pole 208, where the upper and lower coil portions are connected with each other by connection tabs. Regardless of the coil configuration used in operation electrical pulses are sent to the write head with different patterns of positive and negative currents, and the current in the coil 202 induces a magnetic field across the gap between the head and the magnetic media, which in turn magnetizes a small area on the medium.

A perpendicular write head, such as write head 200, comprises a write pole (main pole 208) with a very small cross section at the pole tip 208a, tapered down from the cross section along the length of the yoke 208b from which the pole tip protrudes, and an upper return pole 218 having a much larger cross section along the length. Also shown in FIG. 2 is an optional stitch pole 207 for assisting in delivering the magnetic field, a back gap 203, and one or more shield 209 for assisting in focusing the magnetic field emitting from pole tip 208a, where upper return pole 218 has contact areas with shield 209 and back gap 203.

Magnetic Recording Head Main Pole Shielding

Figure 3:
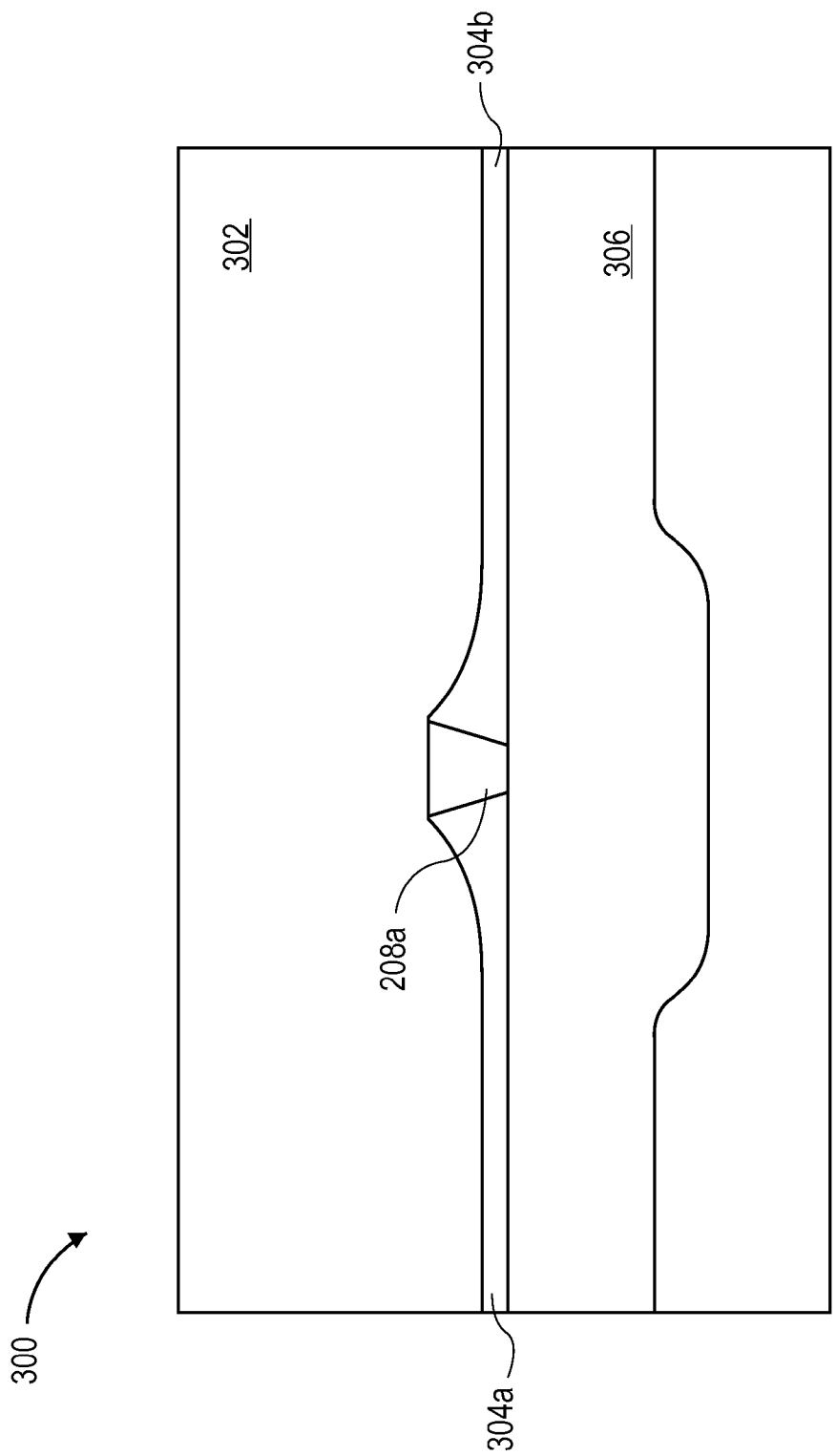
FIG. 3 is an air bearing surface (ABS) view illustrating a magnetic recording head shield structure.

FIG. 3 is an air bearing surface (ABS) view illustrating a magnetic recording head shield structure. FIG. 3 illustrates a portion of a magnetic write head 300, which comprises a magnetic pole tip 208a of a main pole 208 (FIG. 2). A shield structure, such as shield 209 (FIG. 2) may be configured, for example, as a group of shields comprising (a) a trailing shield 302 in the direction trailing the main pole tip 208a when flying over a track of the magnetic media, (b) side shields 304a, 304b on each side of the main pole tip 208a in the cross-track direction, and (c) a leading shield 306 in the direction leading the main pole tip 208a when flying over a track of the magnetic media. Functionally, trailing shield 302 may comprise a soft magnetic material for raising the magnetic field gradient of the recording head, and side shields 304a, 304b may comprise a magnetic material for preventing leakage of the magnetic field from the main pole 208.

A magnetic domain is a microscopic region within a magnetic material, the domain having uniform magnetization, where the individual magnetic moments of the atoms are aligned with one another and point in the same direction. Applying an external magnetic field to the material can make the domain walls move, causing the domains aligned with the field to grow, and the opposing domains to shrink. When the external field is removed, the domain walls remain "pinned" in their new orientation, such as when a ferromagnetic material is magnetized and becomes a permanent magnet. Thus, from a macroscopic viewpoint, a magnetic material can be said to have a "predominant direction of magnetization", where the individual magnetic domains largely align with one another and point in the same direction referred to as the "predominant direction of magnetization". However, these magnetic orientations (or "direction of magnetization") may drift under the influence of magnetic fields over time.

Thus, in the context of the magnetic shields constituent to the write head 300 (i.e., trailing shield 302, side shields 304a, 304b, and leading shield 306), the direction of magnetization may drift over time from their respective predominant directions of magnetization.

Introduction

If the track density (tracks per inch, or "TPI") is increased in order to raise the surface recording density, the problem of data erasure due to ATI arises because the magnetic field that is applied to adjacent tracks becomes considerably large. Also, if the track width is decreased in order to raise the TPI, it becomes necessary to decrease the geometrical width of the main magnetic pole. If the geometrical width of the main magnetic pole is reduced then the magnetic field intensity from the main magnetic pole is consequently decreased, so it is necessary to raise the magnetic field intensity by raising the current flowing in the coil. However, this tends to result in FTI caused by magnetic field leakage from the tracks far from the main magnetic pole, largely because of leakage of magnetic field from the magnetic shield that is arranged in the vicinity of the main magnetic pole. Generally, the ATI and FTI phenomena are caused by the magnetic field that leaks from the interface surface between magnetic shields surrounding or in the vicinity of the main magnetic pole, or from a shield itself, and eliminates data recorded on the magnetic disk when magnetic recording is repeated.

One approach to avoiding data elimination due to ATI and/or FTI is that, when a certain number of recording operations is reached for each track in an HDD, a prevention function is executed which rewrites an adjoining track with the original (i.e., possibly eliminated or corrupt) data. However, since the performance of an HDD is reduced by execution of this function, a magnetic recording head structure that does not generate FTI is more desirable.

Suppressing Generation of Magnetic Field Leakage to Recording Media

The amount of degradation of the bit error rate in the track direction is measured by performing repeated writings at the center track position. The quality of data written onto the recording media is degraded by magnetic field leakage not only in adjacent tracks but also in the case of tracks that are more than 1 um away. Observation of the domain structure of the main magnetic pole of a typical head from which FTI is generated, and the domain structure of the magnetic shield(s) that is arranged in the vicinity of the main magnetic pole, discovered a zigzag domain structure in the trailing shield. Because of the shape of these domains and the movement of these domains, magnetic field leakage from the magnetic head occurs in the direction of the recording media, synchronized with the recording action from the coil. This results in degradation of the data on the recording media.

Analysis of the amount of error rate degradation in the track direction after writing many times (e.g., ten thousand) onto the same track showed a dependence of the error rate due to FTI on the number of write operations. The analysis showed that degradation of the error rate commenced when the number of write operations exceeds one thousand, and that the error rate degraded by about four orders of magnitude after ten thousand write operations. Further analysis involving the location from which this FTI magnetic field leakage is generated (referred to as a "hotspot") concluded that the hotspot is within the trailing shield of the magnetic recording head, which was reinforced by the observations of the zigzag domains in the trailing shield. Thus, it was concluded that magnetic field leakage from the vicinity of the domains observed in this trailing shield (see, e.g., trailing shield 302 of FIG. 3) is one contributing cause of FTI.

Techniques are described for suppressing generation of magnetic field leakage to the recording media at far tracks (e.g., more than a track away from the desired track) without reducing the magnetic field intensity, by controlling the magnetization within the magnetic shields to be more persistently in a single predominant direction.

Figure 4:
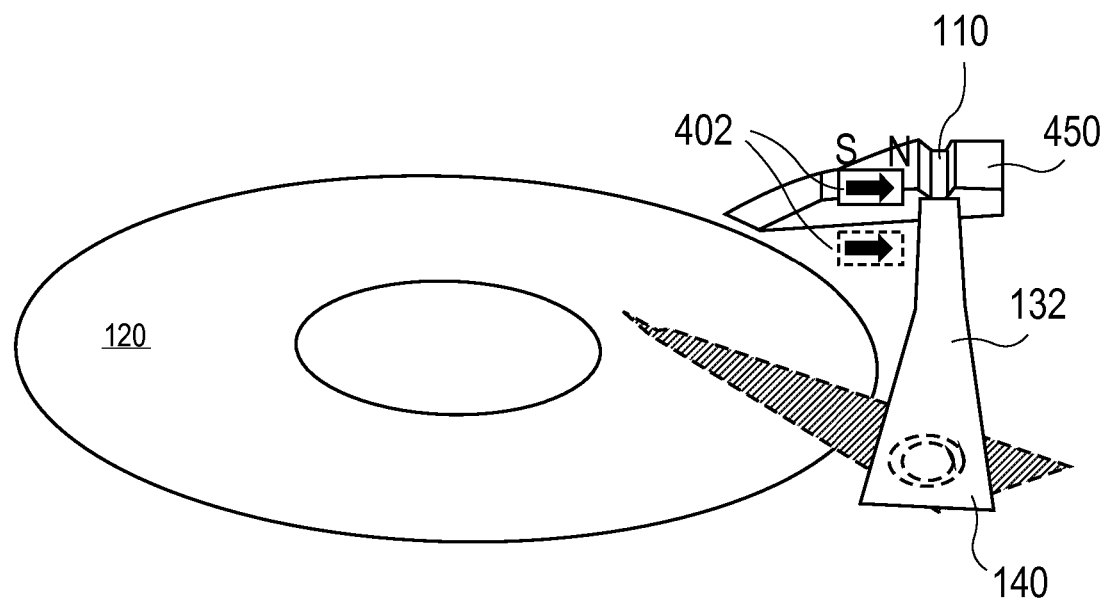
FIG. 4 is a simplified perspective view illustrating components of a hard disk drive (HDD), according to an embodiment of the invention.

FIG. 4 is a simplified perspective view illustrating components of a hard disk drive (HDD), according to an embodiment of the invention, wherein like numerals referring to elements from other figures (such as FIG. 1) refer to like components. In addition to the HGA 110 (head gimbal assembly), arm 132, voice coil 140, and media 120, FIG. 4 depicts a load/unload ramp 450 and a magnetic field-generating device 402. As described in reference to respective figures, a magnetic recording head, such as magnetic write head 200 of FIG. 2 and/or magnetic write head 300 of FIG. 3 and/or magnetic write head 700 of FIG. 7, comprises one or more respective magnetic shield. For example, write head 200 comprises shield 209; write head 300 comprises trailing shield 302, side shields 304a, 304b, and leading shield 306; and write head 700 comprises high magnetic moment material layer 706 and low magnetic moment material 708.

According to an embodiment, an HDD is equipped with a magnetic field-generating device 402 positioned in the vicinity of the load/unload ramp 450. According to various embodiments, magnetic field-generating device 402 is constituent to the load/unload ramp 450, magnetic field-generating device 402 is positioned adjacent to the load/unload ramp 450 (generally depicted dashed in FIG. 4), or a plurality of magnetic field-generating devices 402 are configured constituent to and adjacent to the load/unload 450. The magnetic field-generating device 402 generates a magnetic field, such that a magnetic write head (e.g., magnetic write head 200 of FIG. 2 and/or magnetic write head 300 of FIG. 3) of HGA 110 moves into the magnetic field generated by the magnetic field-generating device 402 while being unloaded, or parked, to load/unload ramp 450. Likewise, the magnetic write head of HGA 110 would move into the magnetic field generated by the magnetic field-generating device 402 while being loaded back over the media 120 from load/unload ramp 450.

According to an embodiment, the magnetic field-generating device 402 comprises a permanent magnet, which is an object made from a magnetically "hard" material that is magnetized, and tends to stay magnetized, and thus creates its own persistent magnetic field. According to another embodiment, the magnetic field-generating device 402 comprises an electromagnet, typically constructed from a coil of wire that acts as a magnet when an electric current (e.g., DC or direct current) is passed through it but stops operating as a magnet when the current is stopped. According to another embodiment, the magnetic field-generating device 402 comprises an alternating-current (AC) based device, typically constructed from a coil of wire that acts as a magnet when an electric current (e.g., AC or alternating-current) is passed through it. By utilizing an electromagnet, the direction of application of magnetization to the head can be altered in any desired manner and, by employing an AC magnetic field or AC demagnetization field whose magnetic field amplitude is gradually diminished, the magnetic shields of the head can be controlled in any desired manner, such that control of the recording magnetic field leakage that is applied in the media direction can be achieved.

The magnetic field-generating device 402 is positioned so that the magnetic field generated by the magnetic field-generating device 402 pins the direction of magnetization of a magnetic shield associated with the write head into the predominant direction of magnetization of the shield. For example, the magnetic field-generating device 402 is positioned within the HDD so that its magnetic poles are aligned to generate a magnetic field whose direction substantially coincides with the predominant direction of magnetization of the magnetic shield material when the write head passes over the magnetic field-generating device 402 and thus through the corresponding magnetic field.

Figure 5:
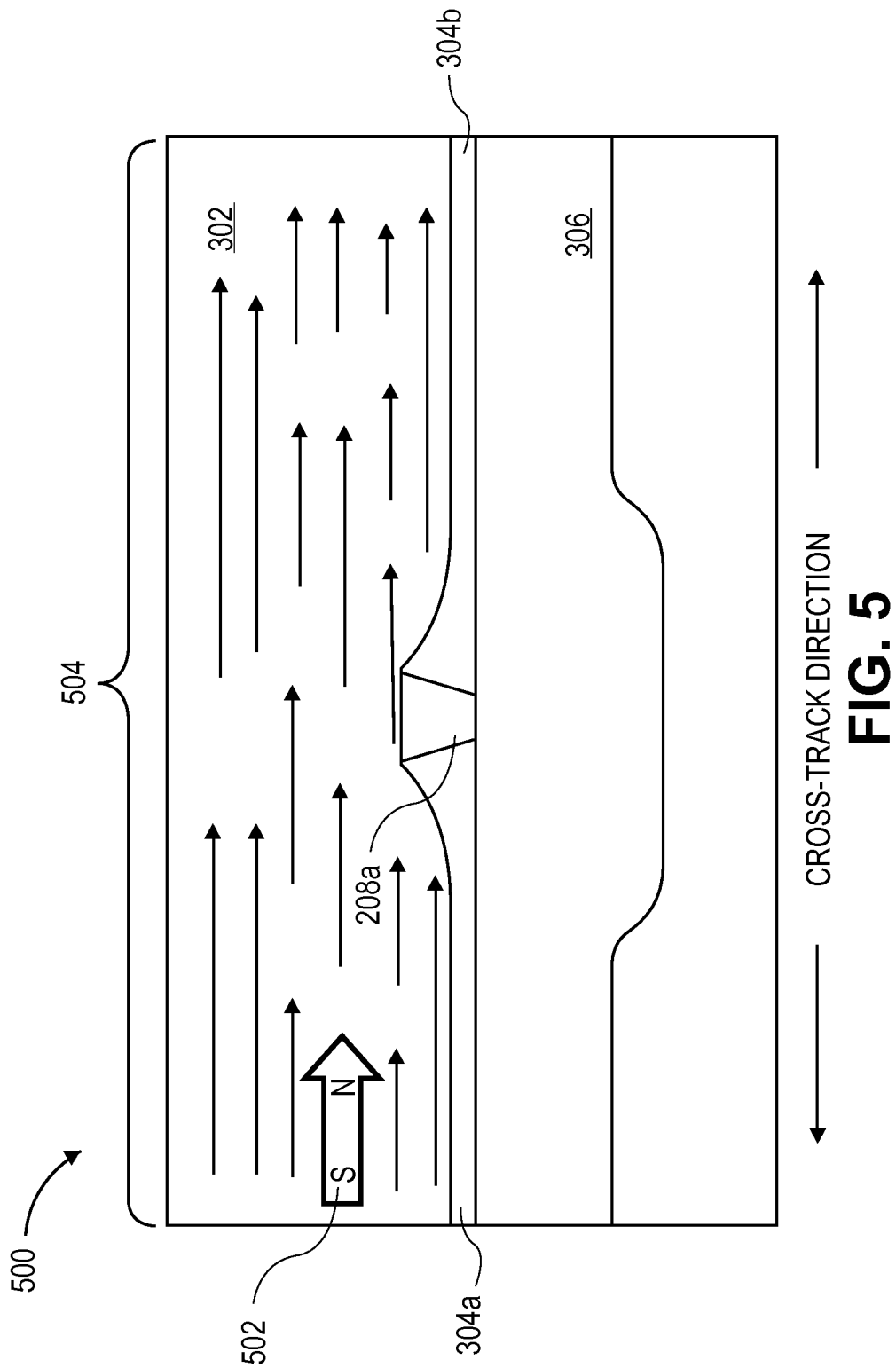
FIG. 5 is an air bearing surface (ABS) view illustrating a magnetic recording head shield structure under application of an external magnetic field, according to an embodiment of the invention.

FIG. 5 is an air bearing surface (ABS) view illustrating a magnetic recording head shield structure under application of an external magnetic field, according to an embodiment of the invention. FIG. 5 illustrates a portion of a magnetic write head 500, which like write head 300 (FIG. 3) comprises a magnetic pole tip 208a of a main pole 208 (FIG. 2) and a shield structure comprising (a) trailing shield 302 in the direction trailing the main pole tip 208a when flying over a track of the magnetic media, (b) side shields 304a, 304b on each side of the main pole tip 208a in the cross-track direction (e.g., across a disk track in a generally radial direction), and (c) a leading shield 306 in the direction leading the main pole tip 208a when flying over a track of the magnetic media, functioning similarly as described in reference to FIG. 3.

FIG. 5 illustrates application of an external magnetic field 502 to at least trailing shield 302, in a certain direction largely consistent with the predominant direction of magnetization of trailing shield 302. According to an embodiment, the source of the magnetic field 502 that is applied to at least the trailing shield 302 is the magnetic field-generating device 402 (FIG. 4). Consequent to application of magnetic field 502, the direction of magnetization 504 (depicted as the multiple arrows within trailing shield 302 and parallel to magnetic field 502) of the trailing shield 302, for example, is realigned with the predominant direction of magnetization of the trailing shield 302. Thus, the magnetization within the magnetic shield(s) is affected to be more persistently in a single predominant direction, away from the direction toward the media 120 (FIG. 4), thereby suppressing recording magnetic field leakage in the direction of the media 120, which in turn inhibits or eliminates corresponding far track interference (FTI).

The foregoing describes the application of a magnetic field from a magnetic field-generating device 402 to the trailing shield 302 of a magnetic recording head, which has been found to suppress recording magnetic field leakage and related FTI. However, implementation of the embodiments described herein is not limited to application of the magnetic field to pin the direction of magnetization of a trailing shield. Rather, the techniques described herein may be applicable, for example, to other magnetic shield structures associated with a magnetic recording head (see, e.g., magnetic write head 700 of FIG. 7), to combat different problems (e.g., adjacent track interference, or ATI), in other magnetic storage devices other than an HDD, and the like. Thus, there is broad potential application of the configurations and techniques described and claimed herein.

Managing Far Track Interference

Figure 6:
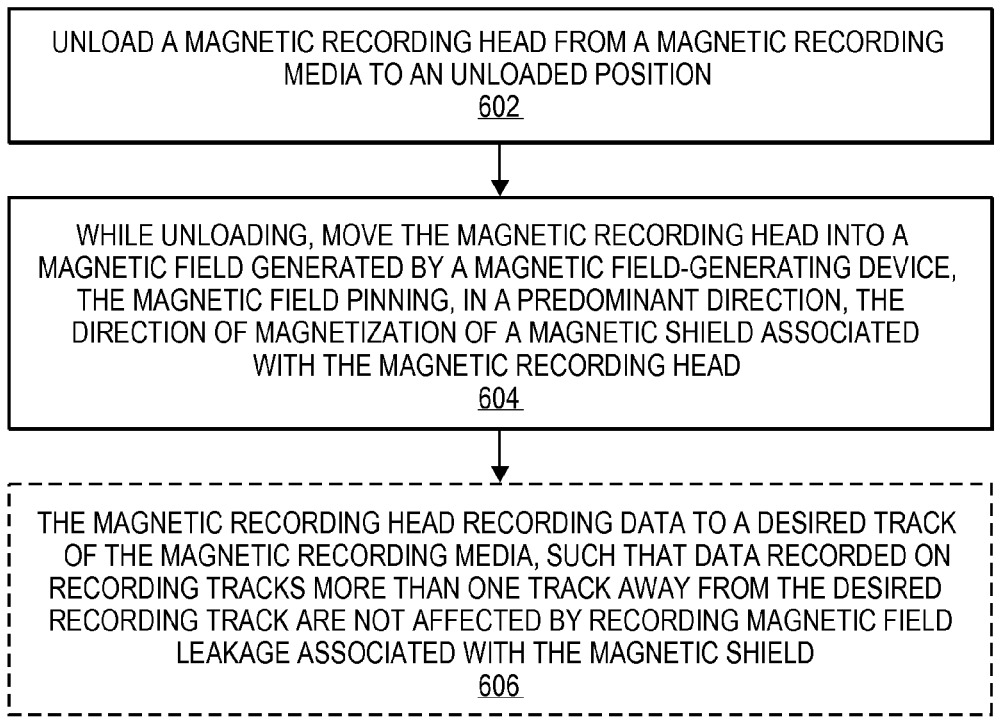
FIG. 6 is a flow diagram illustrating a process for managing far track interference, according to an embodiment of the invention.

FIG. 6 is a flow diagram illustrating a process for managing far track interference, according to an embodiment of the invention. For a non-limiting example, the following process may be used to affect the direction of magnetization within the magnetic shield(s) of a magnetic recording head away from the direction toward the media, and thereby suppress recording magnetic field leakage in the direction of the media, which in turn inhibits or eliminates corresponding far track interference (FTI).

At block 602, a magnetic recording head is unloaded from a magnetic recording media to an unloaded position. For example, a magnetic recording head such as write head 200 (FIG. 2), write head 300 (FIG. 3), or write head 700 (FIG. 7) that is constituent to an HGA 110 (FIG. 4) is unloaded from media 120 (FIGS. 1 and 4) and, possibly, parked on a load/unload ramp 450 (FIG. 4).

At block 604, while unloading the magnetic recording head (block 602), the magnetic recording head is moved into a magnetic field that is generated by a magnetic field-generating device, whereby the magnetic field pins in a predominant direction the direction of magnetization of a magnetic shield that is associated with the magnetic recording head. For example, while unloading the magnetic recording head such as write head 200 (FIG. 2), write head 300 (FIG. 3), or write head 700 (FIG. 7), the magnetic recording head is moved into a magnetic field 502 (FIG. 5) that is generated by a magnetic field-generating device 402 (FIG. 4), whereby the magnetic field 502 pins in a predominant direction the direction of magnetization 504 (FIG. 5) of magnetic trailing shield 302 (FIG. 5) that is associated with the magnetic recording head.

Further, at optional block 606 (depicted as optional by using a dashed block), the magnetic recording head records data to a desired track of the magnetic recording media, such that the data previously recorded on one or more recording tracks that are more than one track away from the desired track (i.e., one or more "far track") is not affected by any recording magnetic field leakage associated with the magnetic shield. For example, the magnetic recording head, such as write head 200 (FIG. 2), write head 300 (FIG. 3), or write head 700 (FIG. 7), records data to a desired track of the recording media 120 (FIGS. 1 and 4), such that the data previously recorded on one or more far track is not affected by any recording magnetic field leakage associated with the magnetic shield 302 (FIG. 5), which is a manifest inhibition of FTI.

According to an embodiment, a count of the number of write operations performed by the magnetic recording head is tracked, and unloading the magnetic recording head is initiated in response to the count exceeding a certain number. For a non-limiting example, upon the write count for a given sector unit such as a track sector (a subdivision of a track) reaching 1000 then the process described in reference to FIG. 7 may be initiated by one of the electronic components within the storage device, such as HDD 100 (FIG. 1).

Application to a Heat-Assisted Magnetic Recording Head

Further, a mechanism in which a count of the number of write operations performed by the magnetic recording head is tracked, and when a fixed count is exceeded a magnetic field is applied to the magnetic shield(s), may be applied to a heat-assisted magnetic recording (HAMR) storage device. A HAMR storage device employs a technique in which recording by the magnetic recording head is assisted by reducing the coercive force of the recording media by local application of heat to the media via, for example, a laser diode (or other heat source) mounted on the slider carrying the recording head. However, since this heat source is positioned in very close proximity to the recording head, the designed recording magnetic field in the vicinity of the main magnetic pole and the magnetic field within the shields for controlling the magnetic field leakage become magnetically unstable due to transmission thereto of the heat from the laser.

Figure 7:
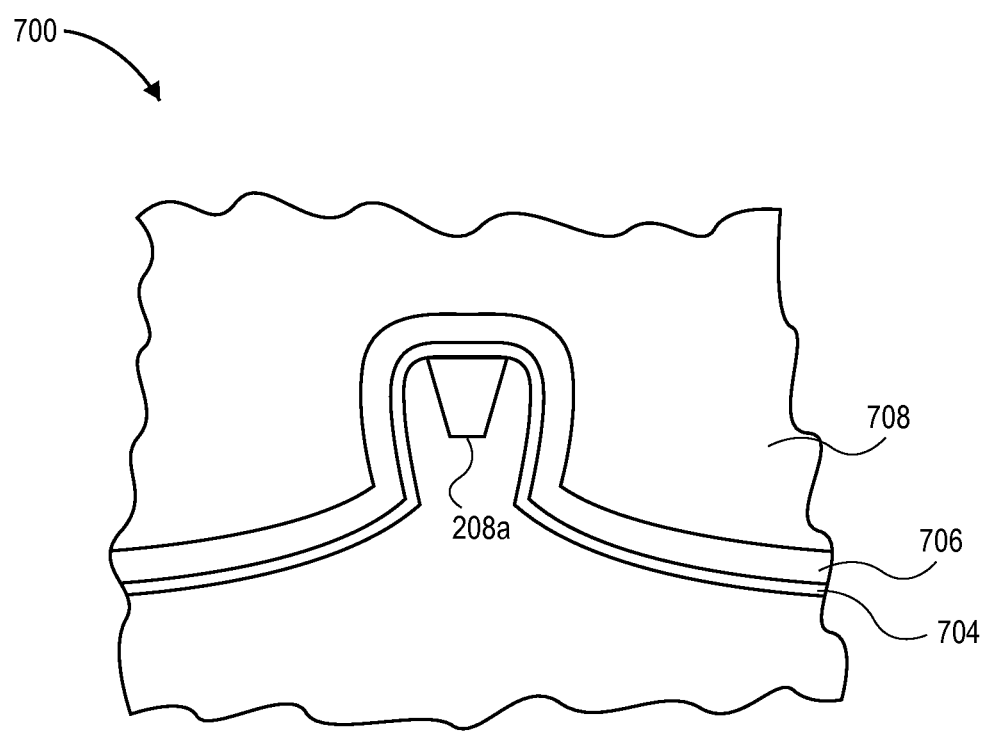
FIG. 7 is an air bearing surface (ABS) view illustrating a magnetic recording head wrap-around shield (WAS) structure.

Accordingly, and according to an embodiment, a count of the number of heat interactions between the HAMR head and the media is tracked and, when this count exceeds a certain number the process described in reference to FIG. 7 may be initiated by one of the electronic components within the storage device. For a non-limiting example, a "heat interaction" between the HAMR head and the media may comprise an optical emission from a laser to a magnetic disk for heat-assisted recording purposes. This, again, would be to affect the direction of magnetization within the magnetic shield(s) of the magnetic recording head away from the direction toward the media, and thereby suppress recording magnetic field leakage in the direction of the media, which in turn inhibits or eliminates corresponding FTI.

As mentioned, implementation of the embodiments described herein is not limited to application of the magnetic field to pin the direction of magnetization of a trailing shield, or to the magnetic shield structure depicted in FIGS. 3 and 5. Alternatively, shield 209 (FIG. 2) may comprise a wrap-around shield ("WAS") surrounding a large portion of the main pole tip 208a (FIG. 2) near the ABS surface.

FIG. 7 is an air bearing surface (ABS) view illustrating a magnetic recording head wrap-around shield (WAS) structure. FIG. 7 illustrates a portion of a magnetic write head 700, which comprises a magnetic pole tip 208a of a main pole (e.g., main pole 208 of FIG. 2). The pole tip 208a is wrapped by a WAS structure comprising a relatively thin high magnetic moment material layer 706 (also referred to simply as the "high-moment layer" and the "high-moment portion" as it may comprise multiple thin layers or films) and some bulk low magnetic moment material 708 (also referred to simply as "low moment portion"), where the high-moment portion 706 has a higher magnetic moment than the low-moment portion 708. A thin layer 704 of magnetic insulating/isolating material, such as Ru, may be used to separate the pole tip 208a from the WAS structure. The remaining material under the isolating layer is primarily filler, such as alumina. A WAS is used to "catch" and redirect flux leakage from the main pole and pole tip 208a to the return pole (e.g., upper return pole 218 of FIG. 2), and is constructed of magnetic materials having a lower magnetic moment than the main pole material so that the WAS materials are less likely to generate their own magnetic flux from the excitation of the main pole.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive comprising:
   a magnetic-recording disk rotatably mounted on a spindle;
   a magnetic recording head comprising:
      a magnetic write pole extending to an air bearing surface,
      a write head magnetic shield disposed in the vicinity of said magnetic write pole, said magnetic shield having a predominant direction of magnetization;

at least one magnetic return pole, magnetically connected with said write pole in a region removed from said air bearing surface;

a load/unload ramp positioned for unloading said magnetic recording head from said magnetic recording disk; and a magnetic field-generating device positioned in the vicinity of said load/unload ramp such that said magnetic recording head moves into a magnetic field generated by said magnetic field-generating device while said magnetic recording head is unloaded, said magnetic field pinning the direction of magnetization of said magnetic shield in said predominant direction of magnetization.

2. The hard disk drive of claim 1, wherein said magnetic field-generating device is a permanent magnet.

3. The hard disk drive of claim 1, wherein said magnetic field-generating device is an electromagnet.

4. The hard disk drive of claim 1, wherein said magnetic field-generating device is an alternating-current-based magnetic field-generating device.

5. The hard disk drive of claim 1, wherein said magnetic shield is positioned on a trailing side of said magnetic write pole.

6. The hard disk drive of claim 1, wherein said predominant direction of magnetization of said magnetic shield is in a cross-track direction relative to said magnetic recording disk.

7. The hard disk drive of claim 1, wherein said load/unload ramp comprises said magnetic field-generating device.

8. The hard disk drive of claim 1, wherein said magnetic field-generating device is positioned adjacent to said load/unload ramp.

9. A method for managing far track interference (FTI), the method comprising:

unloading a magnetic recording head from a magnetic recording medium to an unloaded position;

while unloading to said unloaded position, moving said magnetic recording head into a magnetic field generated by a magnetic field-generating device, said magnetic field pinning in a predominant direction the direction of magnetization of a write head magnetic shield associated with said magnetic recording head.

10. The method of claim 9, further comprising:

said magnetic recording head recording data to a desired track of said magnetic recording medium, such that data recorded on recording tracks more than one track away from said desired recording track are not affected by recording magnetic field leakage associated with said magnetic shield had said direction of magnetization of said magnetic shield not been pinned by said magnetic field generated by said magnetic field-generating device.

11. The method of claim 9, further comprising:

tracking a count of a number of write operations performed by said magnetic recording head on a particular unit of storage; and wherein unloading said magnetic recording head includes unloading said magnetic recording head in response to said count exceeding a certain number.

12. The method of claim 11, wherein said particular unit of storage is a track sector.

13. The method of claim 9, wherein said magnetic recording head is a heat-assisted magnetic recording (HAMR) head, the method further comprising:

tracking a count of a number of heat interactions with said magnetic recording medium performed by said HAMR head; and wherein unloading said magnetic recording head includes unloading said HAMR head in response to said count exceeding a certain number.

14. The method of claim 9, wherein moving said magnetic recording head includes moving said magnetic recording head into said magnetic field generated by a permanent magnet.

15. The method of claim 9, wherein moving said magnetic recording head includes moving said magnetic recording head into said magnetic field generated by an electromagnet.

16. The method of claim 9, wherein moving said magnetic recording head includes moving said magnetic recording head into said magnetic field generated by an alternating current-based magnetic field-generating device.

17. The method of claim 9, wherein pinning includes pinning in said predominant direction said direction of magnetization of said magnetic shield positioned on a trailing side of a magnetic write pole of said magnetic recording head.

18. The method of claim 9, wherein pinning includes pinning said direction of magnetization of said magnetic shield in a cross-track direction relative to said magnetic recording medium.

19. The method of claim 9, wherein moving said magnetic recording head includes moving said magnetic recording head into said magnetic field generated by said magnetic field-generating device that is constituent to a load/unload ramp.

* * * * *